(12) United States Patent
Itzhak

(10) Patent No.: US 6,284,144 B1
(45) Date of Patent: *Sep. 4, 2001

(54) WATER TREATMENT

(75) Inventor: David Itzhak, Omer (IL)

(73) Assignee: Argad-Eyal Water Treatment Industries Inc., Atlit (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/365,067

(22) Filed: Jul. 30, 1999

(30) Foreign Application Priority Data

Jul. 30, 1998 (IL) ........................................... 125592

(51) Int. Cl.⁷ ................................ C02F 1/461; C02F 1/72
(52) U.S. Cl. .................... 210/753; 210/754; 210/755; 210/759; 210/764; 205/473; 205/556
(58) Field of Search .................................. 210/752, 753, 210/754, 755, 756, 758, 759, 764; 205/334, 464, 473, 556

(56) References Cited

U.S. PATENT DOCUMENTS

| | | |
|---|---|---|
| 2,757,854 | 8/1956 | Wall . |
| 3,719,570 * | 3/1973 | Lancy .................................. 204/149 |
| 4,385,973 | 5/1983 | Reis et al. . |
| 4,966,775 * | 10/1990 | Donofrio et al. .................... 210/764 |
| 5,424,032 | 6/1995 | Christensen et al. . |
| 5,575,945 * | 11/1996 | Perlman .............................. 210/756 |
| 5,662,940 | 9/1997 | Hight et al. . |
| 5,683,724 * | 11/1997 | Hei et al. ............................ 424/616 |
| 5,783,092 * | 7/1998 | Brown et al. ....................... 210/764 |
| 5,851,407 * | 12/1998 | Bowman et al. .................... 210/759 |
| 5,882,526 * | 3/1999 | Brown et al. ....................... 210/759 |

FOREIGN PATENT DOCUMENTS

| | | |
|---|---|---|
| 0 403 465 A1 | 12/1990 | (EP) . |
| 0 403 465 B1 | 12/1990 | (EP) . |
| 0 517 102 A1 | 12/1992 | (EP) . |

OTHER PUBLICATIONS

Campo et al.; "Catalytic Oxidation in Natural Water", CA 104(95133Y) p. 421 (1986).
Dodonov et al.; Prevention of Biological Fouling of Heat Exchangers by Iron Metabolizing Bacteria, C A vol. 115(166275m).
Matson, et al.; "Biocidal Methods and Composition for Recirculating Water Systems", CA vol. 114 (17993 r) p. 427 (1991).
Fraser J. A. L.; "Peroxygens in Environmental Protection", C A vol. 105(84492j) p. 361 (1986).

* cited by examiner

Primary Examiner—David A. Simmons
Assistant Examiner—Betsey Morrison Hoey
(74) Attorney, Agent, or Firm—Foley, Hoag & Eliot LLP

(57) ABSTRACT

Method of controlling biofouling and microorganism population levels in a water system, comprising adding to the water a redox buffer and oxidizing thereafter. The redox buffer may be a peroxide or hydrogen peroxide ($H_2O_2$), which is added to the water. The redox buffer keeps the redox potential between about 250 to 450 mV. The oxidant may include a halogenating chemical which is chosen from among the hypohalite species, such as HOCl, NaOCl, NaOBr, HOBr, OBr⁻, OCl⁻, $Br_2$, $Cl_2$ and acid solutions. The acid solution is selected from among those containing ($Cl_2$+HCl), ($Br_2$+HBr), ($Br_2$+HCl), trichlorocyanoric acid (TCCA), bromochlorodimethyl hydantoin (BCDMH), dibromodimethyl hydantoin (DBDMH), dichlorodimethyl hydantoin (DCDMH), and other halogen agents, preferably an active chlorine donor or sodium hypochlorite (NaOCl) or hypohalide acid (HOX), such as hypochlorous acid (HOCl) or hypobromous acid (HOBr), or hypohalite ion OX, wherein X is Cl or Br, or halohydantoin.

24 Claims, No Drawings

WATER TREATMENT

FIELD OF THE INVENTION

The present invention relates to the disinfection of water, and to the control of biofouling in clear and transparent water. In particular, the invention relates to the disinfection of salty swimming pool and mineral water, and the like water.

BACKGROUND OF THE INVENTION

Various methods for purifying water and for controlling the population level of biofouling and microorganisms have been disclosed. U.S. Pat. No. 5,662,940 relates to biocidal methods and compositions for recirculating the water system, comprising a hypochlorite donor and a bromide donor. This patent specifically relates to the disinfection of water in cooling towers, swimming pools and spas.

U.S. Pat. No. 5,424,032 describes a method of treating water using innocuous chemicals for the treatment of microorganisms.

The oxidizing biocide including free halogens, or hypohalites, or salts of hypohalites or hypohalite ion OX wherein X is Cl or Br, and halohydantoins such as bromochloro- or dibromodimethyl hydantoins or any oxidants which are used for disinfecting water.

When the treated water is salty water and mineral water, the disinfection agent causes a discoloration of the water which acquires a yellowish tinge, as well as a sensible turbidity thereof.

U.S. Pat. No. 4,385,973 relates to a process for disinfecting swimming pool water which comprises circulation with a pump by anodic oxidation in a reactor.

The use of anodic oxidation for the disinfection of liquids is known, for example, from U.S. Pat. No. 2,757,854, in which water that is to be disinfected is passed through a reactor which is provided with electrodes, and the water is treated electrochemically. The factors affecting the degree of disinfection are the electrical current density, the volumetric flow rate of the water, and the chloride content of the water.

It is customary to treat biologically contaminated water with one or more biocides to control the population of microorganisms in the water to prevent biofouling. Several factors play a role in the process: water pH, water temperature, aerobic/anaerobic conditions and salinity of the water. The particular types of microorganisms and the extent of microbial growth depend on the water source, and other factors.

It is a purpose of this invention to provide a process and composition for controlling biofouling and microorganism population levels in swimming pool waters, especially in salty swimming pools and salty mineral water.

It is another purpose of the invention to provide such a process and composition that have a high disinfecting effect, and to provide salty water which contains minerals, such as $Fe^{2+}$, $Mn^{2+}$, and $Mg^{2+}$ and other minerals, which is transparent and clear water.

Oxidizing biocides were found to be effective in salty water containing a concentration of oxidants much higher than usual, and when the hydrogen peroxide concentration is increased, the oxidants' effect is decreased.

Other elements which cause coloration of the water and turbidity in the presence of oxidants are used for disinfection.

SUMMARY OF THE INVENTION

This invention relates to the disinfection and purification of water. In particular, it relates to the disinfection and purification of swimming pool water, salty swimming pool and seawater, mineral water or the like water, for breeding fish and shellfish, etc.

The invention concerns methods and compositions for controlling biofouling and microorganism population levels in swimming pool or the like water, especially in salty mineral swimming pools. The process is performed in an electrolytic cell, controlled by redox electrode and recirculating water which contains peroxides such as hydrogen peroxide ($H_2O_2$) or $Na_2O_2$, in an amount sufficient to maintain redox buffer, and an oxidant, the oxidant including a halogenating chemical hypohalite species, which is chosen from among NaOCl, HOCl, NaOCl, NaOBr, HOBr, $OBr^-$, $OCl^-$, $Br_2$, $Cl_2$, acid solutions such as those containing ($Cl_2$+HCl), ($Br_2$+HBr), ($Br_2$+HCl), trichlorocyanoric acid (TCCA), bromochlorodimethyl hydantoin (BCDMH), dibromodimethyl hydantoin (DBDMH), dichlorodimethyl hydantoin (DCDMH), and other halogen agents, etc., preferably an active chlorine donor or sodium hypochlorite (NaOCl) or hypohalide acid (HOX), such as hypochlorous acid (HOCl) or hypobromous acid (HOBr), or hypohalite ion OX, wherein X is Cl or Br, or halohydantoin, such as bromochloro- or dibromodimethyl hydantoin.

For this purpose, salty water which is to be disinfected is passed through an electroltyic cell or oxidant feeder which is fed into the water, and the water is treated by redox buffer, the term "redox buffer" meaning any compound that will keep the redox potential substantially constant in conditions which do not cause oxidation coloring elements, preferably about 300–410 mV. In a preferred form of the invention, the redox buffer is hydrogen peroxide ($H_2O_2$). When it is desired to treat, e.g., swimming pool water, the redox buffer and the subsequent oxidation has various beneficial effects; for instance, if the water is added and/or circulated in swimming pool and mineral water known to contain bacteriological and virological contaminants, which left untreated become a dangerous source of infection, this treatment helps in removing them. Additionally, it provides salty water which contains minerals, which is transparent and clear water, and prevents coloration and turbidity thereof.

Application of the method of the invention results in a considerable reduction of germ concentration in swimming pools, thus diminishing the risk of infection.

In a preferred form of the invention, when the pH of swimming pool water is typically regulated in the range of 7<pH<8 in salty water, hydrogen peroxide is added and the water is then treated electrochemically, or any other alternative way, the redox potential remaining constant in the range of 250–450 mV, preferably 300–410 mV, and $H_2O_2$ at 0.001–1.0 ppm.

It is a purpose of the invention to provide a process and compositions for killing microorganisms and inhibiting biofouling in waters, especially salty waters, and which prevents the water turbidity, and coloration.

EXAMPLE 1

A swimming pool of 1000 $m^3$ contained salty mineral water. The pool was operated for one day using the anodic oxidation treatment. The pH of the swimming pool water was controlled at between 7.2–7.6. The salty water was passed through an electrolytic cell using DC current of 200 A. The water circulated at the rate of 180 $m^3$/hour, with a make up of 80 $m^3$/fresh water. The redox potential was maintained at about 450–500 mV. After one hour, the water was colored with a yellowish tinge.

After half an hour, the turbidity increased from 0.2 NTU to 0.6 NTU.

After four hours, suspended solids were obtained. Hydrogen peroxide was added, and the concentration was controlled at 0.25 ppm. After 40 minutes, this water treatment provided transparent and clear water, the turbidity being decreased to 0.3 NTU.

EXAMPLE 2

A swimming pool of 1000 m³ contained salty mineral water. The pool was operated for one day using the anodic oxidation treatment. The pH of the swimming pool water was controlled at between 7.2–7.6. The salty water was passed through an electrolytic cell using DC current of 200 A. The water circulated at the rate of 180 m³l/hour, with a make up of 80 m³/fresh water. The redox potential was maintained at about 450–500 mV. After one hour, the water was colored with a yellowish tinge. Hydrogen peroxide was added, and the concentration was controlled at 0.125 ppm. The redox potential was decreased to 380–400 mV. After fifteen minutes, this water treatment provided a high disinfection rate, and transparent, clear water. The free chlorine was measured at about 0.1 ppm.

EXAMPLE 3

A swimming pool of 1000 m³ contained salty mineral water. The pool was operated for one day using the anodic oxidation treatment. The pH of the swimming pool water was controlled at between 7.2–7.6. The salty water was passed through an electrolytic cell using DC current of 200 A. The water circulated at the rate of 180 m³/hour, with a make up of 80 m³/fresh water. The redox potential was maintained at about 400–420 mV. The concentration of hydrogen peroxide was controlled at 0.125 ppm. After one hour, this water treatment provided a high disinfection rate.

TABLE I

| Microorganism | Residue as $Cl_2$ free (total) after one hour | Surviving after one hour |
| --- | --- | --- |
| choliform | 0.1 ppm | less than 10/100 ml |
| pseudomonas | 0.1 ppm | 0/100 ml |
| staphylococcus | 0.1 ppm | between 0–2/100 ml |

The total count of microorganisms was less than 100/1 ml.

EXAMPLE 4

A swimming pool of 1000 m³ contained salty mineral water. The pool was operated for one day using the anodic oxidation treatment. The pH of the swimming pool water was controlled at between 7.2–7.6. The salty water was passed through an electrolytic cell using DC current of 200 A. The water circulated at the rate of 180 m³/hour, with a make up of 80 m³/fresh water. The redox potential was maintained at about 400–420 mV. Hydrogen peroxide was added, and the concentration was controlled at 0.1 ppm. The residue as $Cl_2$ was about 0.1 ppm, as in the results given in Table I above. The total amount of microorganisms was less than 100/1 ml.

EXAMPLE 5

A swimming pool of 1000 m³ contained salty mineral water. The pool was operated for one day using the anodic oxidation treatment. The pH of the swimming pool water was controlled at between 7.2–7.6. The water circulated at the rate of 180 m³/hour, with a make up of 80 m³/fresh water. Hydrogen peroxide was added, and the concentration was controlled at 0.04 ppm. 500 g of BCDMH was fed to the circulated water. The residue as $Br_2/Cl_2$ free was about 0.15 ppm.

TABLE II

| Microorganism | Surviving after one hour | Water depth |
| --- | --- | --- |
| choliform | 0/100 ml | 50 cm |
| pseudomonas | 0/100 ml | " |
| staphylococcus | 2/100 ml | " |
| | | " |
| The total count of microorganisms was 15/1 ml. | | |
| choliform | 0/100 ml | 100 cm |
| pseudomonas | 0/100 ml | " |
| staphylococcus | 0/100 ml | " |
| The total count of microorganisms was 5/1 ml. | | |
| choliform | 0/100 ml | 200 cm |
| pseudomonas | 0/100 ml | " |
| staphylococcus | 0/100 ml | " |
| The total count of microorganisms was 3/1 ml. | | |

Use of BCDMH was effective. The water treatment provided transparent and clear water, and a high disinfection rate.

EXAMPLE 6

A swimming pool of 2500 m³ contained salty mineral water. The pool was operated for one day using the anodic oxidation treatment. The pH of the swimming pool water was controlled at between 7.2–7.6. The water circulated at the rate of 400 m³/hour. BCDMH was fed to the circulated water, hydrogen peroxide was added, and the concentration was controlled at 0.1 ppm. The redox potential was decreased from about 400–420 mV to 320 mV after 6 hours. The residue as $Br_2/C_2$ was about 0.1 ppm. An additional 2000 g of BCDMH was fed to the circulated water, causing a redox potential increase to 400 mV.

Use of BCDMH was effective: the water treatment provided transparent and clear water, and a high disinfection rate.

EXAMPLE 7

A swimming pool of 2500 m³ contained salty mineral water. The pH of the swimming pool water was controlled at between 7.2–7.6. The water circulated at the rate of 400 m³/hour, with a make up of 80 m³/fresh water. $Br_2$ (5%) with HCl solution (33%) was fed to the circulated water at the rate of 1 lit/hour. Hydrogen peroxide was added, and the concentration was controlled at 0.04 ppm. The redox potential was about 420–450 mV.

The residue as $Br_2$ was about 0.1 ppm. Use of 5% $Br_2$ and 33% HCl solution was effective: the water treatment provided transparent and clear water, and a high disinfection rate.

All the above description and examples have been provided for the purpose of illustration and are not intended to be limitative. Many changes can be effected in the water treatment, without exceeding the scope of the invention.

What is claimed is:

1. A method of controlling biofouling and microorganism population levels in salty or mineral water having a redox potential, comprising
combining the water with a redox buffer and an oxidant, wherein the redox buffer maintains the redox potential of the water from about 250 to 450 mV.

2. A method according to claim 1, wherein the redox buffer is a peroxide.

3. A method according to claim 1, wherein the redox buffer is hydrogen peroxide ($H_2O_2$).

4. A method according to claim 3, wherein the redox potential is maintained from about 300 to 410 mV.

5. A method according to claim 3, wherein the concentration of the hydrogen peroxide in the water is between 0.001 and 1 ppm.

6. A method according to claim 1, wherein the water contains iron or manganese.

7. A method according to claim 1, wherein the redox buffer maintains the redox potential from about 300 to 410 mV.

8. A method according to claim 1, wherein the oxidant includes a halogenating chemical.

9. A method according to claim 8, wherein the halogenating chemical includes a hypohalite species.

10. A method according to claim 9, wherein the hypohalite species are chosen from among HOCl, NaOCl, NaOBr, HOBr, $OBr^-$, $OCl^-$, $Br_2$, $Cl_2$ and acid solutions.

11. A method according to claim 10, wherein the hypohalite species includes an acid solution selected from among those containing ($Cl_2$+HCl), ($Br_2$ +HBr), ($Br_2$+HCl), trichlorocyanoric acid (TCCA), bromochlorodimethyl hydantoin (BCDMH), dibromodimethyl hydantoin (DBDMH), dichlorodimethyl hydantoin (DCDMH), sodium hypochlorite (NaOCl), hypohalide acid (HOX), halohydantoin, or hypohalite ion OX, wherein X is Cl or Br.

12. A method according to claim 11, wherein the halohydantoin is bromochloro- or dibromodimethyl- or dichlorodimethyl hydantoin.

13. A method according to claim 10, wherein the acid solution contains an active chlorine donor, sodium hypochlorite (NaOCl), a halohydantoin, or hypohalide acid (HOX).

14. A method according to claim 13, wherein the hypohalide acid is hypochlorous acid (HOCl), hypobromous acid (HOBr), or hypohalite ion ($OX^-$), wherein X is Cl or Br.

15. A method according to claim 1, wherein the oxidant includes halogenating chemicals.

16. A method according to claim 1, wherein the oxidant is $H_2O_2$.

17. A method according to claim 1, wherein the oxidant is generated in situ by electrolysis.

18. A method according to claim 17, wherein the oxidant is generated by in situ electrolysis of chloride ion in the water.

19. A method according to claim 18, wherein the electrolysis of chloride ion provides a concentration of free chlorine of about 0.1 ppm.

20. A method according to claim 17, wherein the electrolysis is performed in an electrolytic cell.

21. A method according to claim 1, wherein the water system includes swimming pool water.

22. A method according to claim 21, wherein the swimming pool water includes salty water.

23. A method according to claim 1, wherein the water system is for breeding fish and shellfish.

24. A method for maintaining salty water containing iron transparent and clear, comprising adding hydrogen peroxide to the water in need of treatment.

* * * * *